United States Patent [19]

Fruitman

[11] Patent Number: 5,436,045
[45] Date of Patent: Jul. 25, 1995

[54] LOW ABRAISION MATERIAL COMPRISING A FIBROUS MATRIX IMPREGNATED WITH A POLYURETHANE RESIN WHEREIN FIBER ENDS ARE EXPOSED ON AT LEAST ONE SURFACE OF THE MATERIAL

[75] Inventor: Clinton Fruitman, Chandler, Ariz.

[73] Assignee: Speedfam Corporation, Des Plaines, Ill.

[21] Appl. No.: 147,909

[22] Filed: Nov. 4, 1993

Related U.S. Application Data

[63] Continuation of Ser. No. 804,292, Dec. 9, 1991, abandoned.

[51] Int. Cl.⁶ ............... B29D 22/00; B32B 9/02; D04H 1/08; F16G 1/02
[52] U.S. Cl. .................. 428/36.1; 428/141; 428/243; 428/270; 428/271; 428/281; 428/290; 428/283; 474/260; 474/264; 474/265; 474/271
[58] Field of Search ............... 474/264, 265, 260, 271; 428/904, 245, 283, 290, 423.1, 909, 36.1, 141, 243, 270, 281

[56] References Cited

U.S. PATENT DOCUMENTS

| | | |
|---|---|---|
| 2,130,944 | 9/1938 | Bowen . |
| 2,179,655 | 11/1939 | Cutler . |
| 2,249,514 | 7/1941 | Berg et al. . |
| 2,249,614 | 7/1941 | Berg et al. ............... 74/231 |
| 3,656,360 | 4/1972 | Fix .................. 474/265 |
| 3,817,820 | 6/1974 | Smith II . |
| 3,830,685 | 8/1974 | Haley et al. ............ 474/260 |
| 3,899,623 | 8/1975 | Okazaki et al. ........ 528/59 |
| 3,908,057 | 9/1975 | Smith II . |
| 3,998,986 | 12/1976 | Williams ............. 474/271 |
| 4,016,117 | 4/1977 | Griffin ................ 524/47 |
| 4,367,425 | 1/1983 | Mendelsohn et al. ...... 525/126 |
| 4,746,684 | 5/1988 | Kuriyama et al. ........ 525/458 |

Primary Examiner—James D. Withers
Attorney, Agent, or Firm—Fitch, Even, Tabin & Flannery

[57] ABSTRACT

Frictional articles useful for power transmission such as frictional drive belts and as non-slip friction surfaces comprised of a matrix of fibers impregnated with a cured and set polyurethane resin.

9 Claims, 1 Drawing Sheet

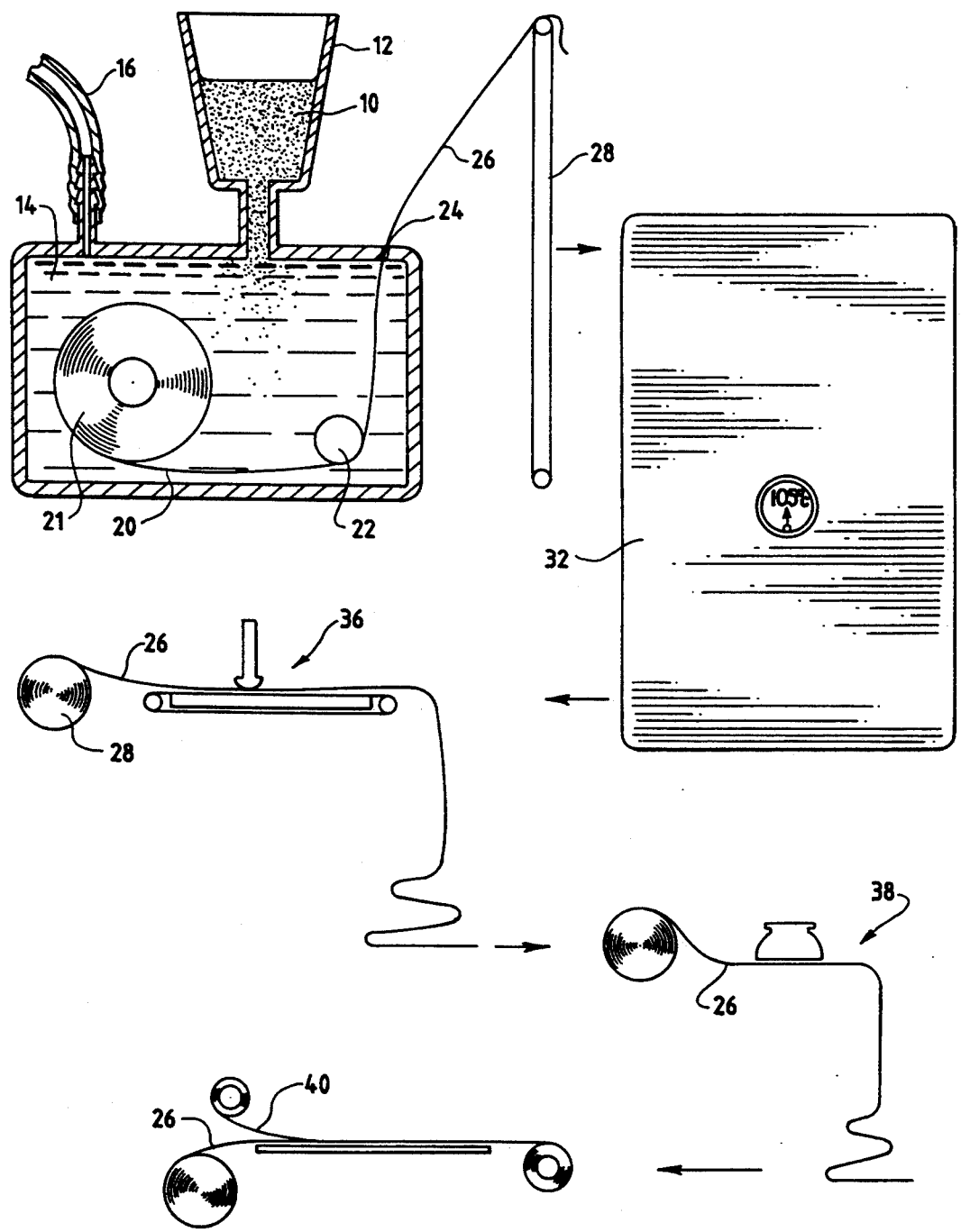

LOW ABRAISION MATERIAL COMPRISING A FIBROUS MATRIX IMPREGNATED WITH A POLYURETHANE RESIN WHEREIN FIBER ENDS ARE EXPOSED ON AT LEAST ONE SURFACE OF THE MATERIAL

This application is a continuation of application Ser. No. 07/804,292 filed Dec. 9, 1991, now abandoned.

This invention relates to articles which exhibit good surface friction characteristics.

Materials having some degree of flexibility and which have friction surfaces find many uses such as friction elements for power transmission such as drive belts for machinery, cables, friction couplings, clutch facings and the like. Materials currently used in these applications, such as rubber and plastics, are slippery when wet and fail to provide the desired frictional traction. Efforts to maintain or improve the frictional properties of prior art frictional materials, such as frictional drive belts, have not been entirely satisfactory, especially when such materials are used in wet environments. Prior art attempts to improve the frictional characteristics of such materials have included the incorporation of abrasive particles such as sand or glass beads into the materials. However, inclusion of abrasive particles in a drive belt often results in the particles breaking loose and/or damaging the friction drive element as well as the object being driven. In such cases the lifespan of the drive element can be disappointingly low due to wear and pullout of abrasive particles.

It is a principal object of the invention to provide an article which exhibits desired friction characteristics with minimum abrasiveness.

It is another object of the invention to provide an article which exhibits desired friction characteristics when used in dry and wet environments.

It is a further object of the invention to provide an article which exhibits desired friction characteristics and good wear resistance while causing minimal or no damage to surfaces which it contacts.

It is a still further object of the invention to provide methods for producing an article which exhibits desirably high friction characteristics when used in dry and wet environments.

SUMMARY OF THE INVENTION

The unexpected discovery underlying this invention is that frictional articles such as machinery frictional drive belts, brakes, friction clutches and slip-resistant pads having significantly improved friction characteristics can be fabricated without inclusion of conventional potentially damaging abrasive particles.

The improved friction article of this invention comprises a matrix of natural or synthetic fibers impregnated with a polyurethane resin which is cured to a rigid state.

Illustrative fibrous materials useful as the matrix are plant fibers such as hemp, wood and cotton and animal fibers such as alpaca or wool fibers, woven wool felt and the like. Preferred matrix materials are fibers which exhibit a relatively high capillary activity such as a woven wool felt. The size of the fibers forming the matrix depends on the desired size of friction article. Particularly preferred fibrous matrix materials are pure wool fibers and wool felts.

The impregnant for the matrix fibers is a single component polyurethane resin having terminal isocyanate groups. The terminal isocyanate groups are reactive with moisture in the air to cause cross-linking of the resin. One such preferred polyurethane resin is "Multi-Tuff" 8800 available commercially from Multi-Chemical Products, Inc., Fontana, Calif. The polyurethane resin in a volatile solvent forms an impregnating liquid. Polyurethane resins having terminal isocyanate groups in a volatile solvent are commonly used as coatings, e.g., floor and deck coatings.

The friction articles of this invention are produced according to one presently preferred procedure by immersing the fibrous matrix components in a bath of the polyurethane resin dissolved in a liquid solvent to accomplish substantially maximum impregnation by the liquid. Impregnation is conducted preferably at ambient temperatures. The impregnated fibrous material is then removed from the impregnating bath, dried, and then heated to effect curing and setting of the resin.

In a preferred but optional embodiment, a minor amount of particulate filler is incorporated into the impregnating bath. The filler material can be employed in amounts of about 0 to 75 grams/liter of the impregnating liquid. Representative filler materials are tints, metal oxides, water-soluble metal salts, particulate starches and the like. Particulate starch is a preferred, readily available filler material. It is believed that the starches chemically react with the resin.

The drawing is a diagrammatic illustration of one preferred procedure for producing a friction drive belt in accordance with the invention. Referring to the drawing, a polyurethane resin 10 in a volatile liquid solvent such as a commercially available polyurethane floor coating (e.g., "Multi-Tuff" 8800) is mixed with particulate corn starch and supplied via hopper 12 to an impregnating bath 14. Vacuum line 16 is used to draw a slight vacuum e.g. 27 inches of mercury) on the impregnating bath to degas the bath including the components thereof so as to facilitate capillary impregnation. A strip of woven felt 20 (for example, 0.065 inch thick) is unwound from spool 21 and passed through the impregnating bath and under guide roller 22. The vacuum impregnated woven felt is removed from the impregnant bath through slit 24 to remove excess impregnant. The size of the woven felt matrix depends on the intended use of the friction article. For example, for use as a friction drive belt, the friction belt can be 0.05 inch thick and 1.5 inches in width.

The impregnated felt 26 is then wound onto drying spool 28 and permitted to dry in ambient air so as to effect cross-linking and partial curing of the resin. Air drying permits evaporation of solvent and is continued until the impregnated material loses its tackiness and feels substantially dry to the touch. Drying in air for periods on the order of say eight hours is usually sufficient.

After air drying the impregnated material is then further cured in a drying oven 32 such as an air convection oven. An elevated humidity level is maintained in oven 32 to facilitate cross-linking and curing of the resin. The oven temperature is generally maintained on the order of 100° to 110° C. and at a relative humidity of about 70% to 90%. The impregnating resin under these conditions is usually fully cured to a set rigid state in a period of about 24 to 36 hours.

After final and complete curing of the resin, the impregnated strips 26 are preferably polished such as by coarse sanding with a belt sander as at 36. If desired, it can be more finely sanded by using an orbital sander as at 38. Preferably, both the top and bottom surfaces of the impregnated felt 26 are sanded to provide substantively uniform top and bottom surfaces substantially free of gloss and of low abrasiveness. Polishing such as by sanding also exposes the fiber ends which increases the capillary action of the fibers which is especially desirable in wet applications.

After sanding, the impregnated strips can be cut to desired lengths depending upon the intended use. Finally, for attachment to a base such as a drive ring, a pressure sensitive adhesive means such as a double sided contact tape 40 can be pressed onto the impregnated article.

The friction articles of this invention find many uses such as frictional elements for power transmission, clutch facings, friction couplings, conveyer drives, conveyer belt surfaces and the like. These articles are particularly advantageous for use in the manufacture of circumferentially polished and textured computer hard memory discs. Thus, the frictional articles in the form of a continuous belt can be advantageously mounted on a drive ring as a friction drive belt to rotate the discs during polishing and texturizing in a wet environment while minimizing damage to the edges of hard discs.

The articles of this invention exhibit high frictional characteristics in a wet or dry application environment while eliminating the need for use of imbedded abrasive particles such as glass beads or sand. Because of their durability and wear resistance, the articles find many uses as slip preventing pads, such as, for example, as walkways on boat decks, on ladders, stairs, airplane wings and so forth.

Those modifications and equivalents which fall within the spirit of the invention are to be considered a part thereof.

What is claimed is:

1. A frictional power transmission element comprised of a matrix of fibers impregnated with a cured and set polyurethane resin having terminal isocyanate groups, said element being substantially free of added abrasive particles and having at least one friction imparting surface substantially free of gloss in which ends of the matrix fibers are exposed to provide friction characteristics and capillary action in wet environments.

2. An element in accordance with claim 1 wherein the matrix is composed of natural or synthetic fibers.

3. An element in accordance with claim 1 wherein the matrix is composed of wool felt.

4. An element in accordance with claim 1 wherein the matrix is composed of wool fibers.

5. An element in accordance with claim 1 wherein the matrix has incorporated therein a particulate non-abrasive filler material.

6. An element in accordance with claim 5 wherein the filler material is particulate starch.

7. An element in accordance with claim 5 wherein the filler material is a metal salt.

8. An element in accordance with claim 1 which is a continuous drive belt.

9. An element in accordance with claim 1 which is a slip-preventing pad.

* * * * *